Sept. 15, 1931.   R. H. PROSSER   1,823,166
RESILIENT WHEEL
Filed Feb. 8, 1927
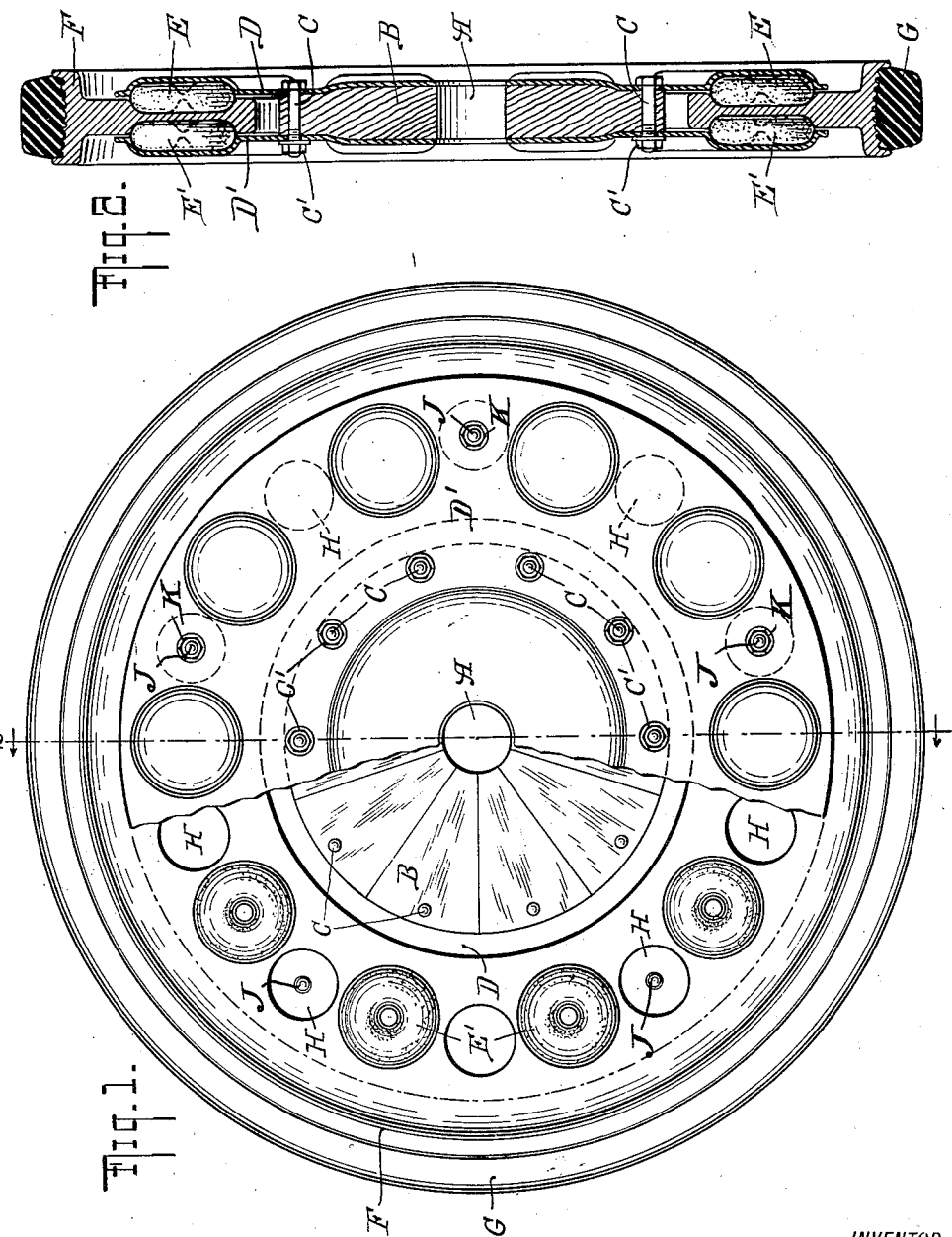
WITNESS
INVENTOR
ROBERT H. PROSSER
BY
ATTORNEYS Patented Sept. 15, 1931

1,823,166

UNITED STATES PATENT OFFICE

ROBERT H. PROSSER, OF SAN FRANCISCO, CALIFORNIA, ASSIGNOR, BY MESNE ASSIGNMENTS, TO CALREW, INCORPORATED, OF CARSON CITY, NEVADA, A CORPORATION OF NEVADA

RESILIENT WHEEL

Application filed February 8, 1927. Serial No. 166,636.

The invention relates to wheels of the type generally known as resilient wheels or cushion wheels and more particularly wheels of the type illustrated and described in Patent No. 1,451,269, of April 10, 1923, H. M. Patch and R. R. Romney. The object of the invention is to simplify the construction and assembly of wheels of this type and to effect economies and advantages which will be referred to more in detail later on. The invention is illustrated in the accompanying drawings in which Fig. 1 is a side view partly broken away of a wheel of the said type, embodying the improvement, and Fig. 2 is a section on line 2—2 of Fig. 1.

In the drawings A indicates the axle opening of the wheel. B indicates a wooden or non-metallic filler periodically apertured to receive the bolts C and extending from the hub aperture outwardly. D and D' indicate respectively two metallic plates, preferably made of pressed steel, which are adapted to be clamped to the wooden filler B by means of the bolts C and nuts C'. In this way the plates D and D' are spaced apart by the filler member B as well as braced by it. The plates D and D', as clearly shown in the drawings, are provided at their outer portions with flat annular inner surfaces which, in the assembled wheel structure, are substantially parallel to each other. Within the field or area of the flat surfaces of the plates D and D' a plurality of circular seats for the reception of the resilient elements E, E' are provided and the relation of said seats with respect to the flat areas previously referred to is such as to leave flat marginal portions of the plates extending radially inwardly and outwardly adjacent to each seat. F is an annular rim member provided with a web member extending inwardly from the inside of said rim member in a radial direction and having a pair of substantially flat faces opposing and closely adjacent to but out of contact with the adjacent flat surfaces of the plates D, D'. A plurality of seats opposing the seats of the plates D, D' are incorporated on both sides of the web of the rim member F and these seats, like the seats in the plates D, D', are circularly disposed around the web member within the flat areas thereof in such a way as to leave relatively wide flat marginal portions extending radially inwardly and outwardly adjacent to each seat. In the assembled wheel this construction results in a structure in which the flat marginal portions of the plates D, D' and of the web of the rim member F are in opposed relation with a small clearance gap therebetween and maintain a mutually overlapping arrangement of smooth parallel overlying surfaces, notwithstanding partial relative displacement between the plates and the web member occurring at any operating loads up to the maximum loads for which the wheel is adapted. This means that the innermost and outermost flat marginal portions of the web and of the plates are of an adequate width to assure the aforesaid result. Resilient disk-like elements E, E', preferably made of rubber or other nonmetallic substances and shaped to act as pressure absorbing elements, are snugly seated in each pocket formed by the opposed seats of the web and plates respectively. They consequently fill the pockets formed by the seats of the plates and of the web and contact with the depressed portions of said seats. The resilient elements E, E' are of a width which will assure the maintenance of the spaced relation between the smooth flat marginal portions of the plates and of the web heretofore referred to. The location of the resilient disks E, E' in the assembled wheel is such that their midsectional portions transverse to the wheel axle are aligned with the general plane of the annular portions of the plates and with the plane of the flat portions of the web. This arrangement not only causes the stresses to be transmitted diagonally through the resilient elements E, E' but causes the stresses, in so far as the plates D, D' are concerned, to be absorbed in the direction of the plane of the plates, whereby the plates are protected against buckling and other undesirable stresses. At the same time the provision of the continuous maintenance of the overlapping relation between the flat marginal edge portions of the plates and of the web eliminates all possibility of cutting the resilient disks such as would occur, if any portions of the resilient disks were at any time able to escape laterally from any part of any of the seats which they occupy.

The filler member B preferably extends inwardly to a region adjacent to the axle opening with the plates D and D′ lying adjacent to said opening, but slightly spaced therefrom so that the load forces are transmitted over the axle (not shown) to the filler member B and thence to the plates D and D′.

With a wheel assembled and constructed as aforesaid it is possible by unclamping the clamping means, that is, the nuts C′ and, in case the nuts and bolts K and J hereafter referred to are used in the assembled structure, then also the nuts K, to remove the plate D′ while the rest of the wheel is on the axle. The rim member F can then be taken off and replaced, rubber disks can be re-inserted, and the wheel entirely reassembled on the axle, every part and element thereof automatically occupying its proper position in the re-assembled wheel.

The web portion of the rim member F may be cast integrally therewith and may be in the form of a continuous web interrupted by openings H or it may be otherwise relieved of unnecessary weight by being given any desirable shape or contour. Through alternate apertures H in the web of the rim member F extend fastening bolts indicated as J in Fig. 1, secured in place by nuts K, said bolts extending between alternating pairs of the rubber disks E—E and E′—E′. These bolts J and nuts K serve the purpose of preventing the outer portions of the plates D and D′ from spreading apart, while the apertures H, through which the bolts J extend, are sufficiently large to permit such movement as occurs between the plates D, D′ and the rim member F during travel of the tire over the road. Instead of being integrally cast, the rim member F may be developed as a rolled steel rim, and irrespective of the specific structure of the rim member F it will be possible to provide a relatively permanent combination between the whole of the rim F, considered as a unit and the tire G. The web portion of the rim element F, instead of being figured as indicated in the drawings, may obviously also be developed in a variety of functionally equivalent ways, the important consideration in that respect being that the web or parts associated therewith shall be operative in the proper way upon the resilient disks E and E′. These disks E and E′ also may have other specific forms than those indicated in the drawings.

In order to understand certain special advantages flowing from the present invention, it should be borne in mind that heretofore the solid rubber tires employed on trucks have ordinarily been vulcanized to metal rims having a substantially cylindrical inner face, these rims being adapted to be slipped upon the wheel, being forcibly pressed on to the wheel under great pressure. The wheel was an entity by itself and the tire with its rim was a second entity. The removal of such a tire from the wheel and the re-application of a new tire to such a wheel presented considerable operating difficulties and was a costly procedure. When, however, the construction of the outer wheel element takes the form of the present invention, the changing of a tire presents relatively negligible operating difficulties. All that is required is the removal of the nuts K from bolts J and of the nuts C′ from the bolts C, whereupon the plate D′ is freely removable, the same thing being true of the resilient elements E′. The whole rim section F with the worn tire G can now be readily lifted off, a new one placed in position, the disks E′ returned to their recesses, the plate D′ reset, and the nuts K and C′ screwed back in place. Whenever in such operations the disks E or E′ are desired to be set in their recesses and to remain therein, a temporary adhesive will accomplish the result. Not only, therefore, does the new structure enable tires to be mounted or to be replaced on resilient wheels with the least effort and with the least operating difficulties, but by making the outer wheel elements in the manner described, it is possible to dispense with the extra thickness of material at the periphery of the wheel formerly represented by the annular tire rim. The cost of the new structure, considered as a casting, is not very much greater than the cost of the usual steel rims. The new structure, being substantially rigid throughout, preserves the perfectly circular contour under all conditions, whereas the prior cylindrical rim frequently presented difficulties due to variations from a true circular condition. The prior tires required special and expensive machinery to press a tire off or on a wheel, all of which is unnecessary with the new tire structure. According to prior practice, if it became necessary to change a tire of a heavy truck, the driver was required to find a shop which had the equipment, that is a tire press, capable of removing his tire. In order to remove such a tire, it was necessary to remove the whole wheel, hubs and bearings, from the axle. No difficulties of this sort are encountered in the use of the new structure, since the tire can be changed anywhere and without requiring any special equipment or skill. As a tire is worn out, the rim elements F can be returned to the factory and a new tire can be easily vulcanized on in place of the worn out tire and the device is ready for re-application to another wheel.

I claim:

A resilient wheel comprising a pair of substantially circular metal plates mounted on a hub in spaced relation to each other, the outer annular facing portions of said plates being flat, a plurality of depressed seats within the area of said flat annular portions and offset with respect to the general planes of the annular portions leaving flat marginal portions of the plates to extend radially inwardly and outwardly adjacent to each seat, a rim member including a web extending inwardly therefrom and having a pair of flat parallel faces opposing and closely adjacent to but out of contact with the adjacent flat annular portions of said plates, a plurality of depressed seats opposing the seats of the plates on opposite sides of said web within the area of its flat surfaces leaving relatively wide flat marginal portions of the web extending radially inwardly and outwardly adjacent to each seat, the flat marginal portions of the web and of the plates all extending radially to an extent sufficient to maintain overlying relations for the maximum movement between the plates and the web during operation of the vehicle with which the wheel may be associated, and resilient non-metallic disk-like elements positioned in each of the pockets formed by the opposed seats of the web and plates, and maintaining the said spaced relation of said plates and web.

In testimony whereof I have hereunto set my hand.

ROBERT H. PROSSER.